United States Patent
Yoo et al.

(10) Patent No.: US 11,062,526 B1
(45) Date of Patent: Jul. 13, 2021

(54) SYSTEM AND METHOD FOR DETECTING AND NOTIFYING ACCESS TO DANGEROUS AREAS IN WORKPLACE USING IMAGE PROCESSING AND LOCATION TRACKING TECHNOLOGY

(71) Applicant: Pusan National University Industry-University Cooperation Foundation, Busan (KR)

(72) Inventors: Young-Hwan Yoo, Busan (KR); Joonyoung Lim, Busan (KR); Youngjin Shin, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 17/117,124

(22) Filed: Dec. 10, 2020

(30) Foreign Application Priority Data

Nov. 20, 2020 (KR) .................. 10-2020-0157025

(51) Int. Cl.
| | |
|---|---|
| *G06T 19/00* | (2011.01) |
| *G06F 1/16* | (2006.01) |
| *G06T 7/70* | (2017.01) |
| *G06T 7/30* | (2017.01) |

(52) U.S. Cl.
CPC ............ *G06T 19/006* (2013.01); *G06F 1/163* (2013.01); *G06T 7/30* (2017.01); *G06T 7/70* (2017.01)

(58) Field of Classification Search
CPC ............ G06T 19/006; G06T 7/30; G06T 7/70
See application file for complete search history.

(56) References Cited

U.S. PATENT DOCUMENTS

| | | | | |
|---|---|---|---|---|
| 10,834,986 | B2* | 11/2020 | Ciccaglione | ........... A42B 3/042 |
| 2013/0169425 | A1* | 7/2013 | Victor | .................... G08G 1/162 |
| | | | | 340/435 |
| 2014/0111647 | A1* | 4/2014 | Atsmon | ................... G08G 1/04 |
| | | | | 348/148 |
| 2015/0281594 | A1* | 10/2015 | Sakaniwa | .............. H04N 5/265 |
| | | | | 348/218.1 |
| 2017/0101056 | A1* | 4/2017 | Park | ......................... B60R 1/00 |
| 2019/0201794 | A1* | 7/2019 | Kang | .................... A63F 13/213 |
| 2019/0287308 | A1* | 9/2019 | Luo | ..................... G06F 3/04815 |
| 2020/0149248 | A1* | 5/2020 | Ram-On | ............. G05D 1/0088 |

FOREIGN PATENT DOCUMENTS

| | | |
|---|---|---|
| KR | 100956125 B1 | 5/2010 |
| KR | 1020200071560 A | 6/2020 |
| KR | 1020200082659 A | 7/2020 |

* cited by examiner

*Primary Examiner* — Ryan R Yang
(74) *Attorney, Agent, or Firm* — Cantor Colburn LLP

(57) ABSTRACT

A system and method for detecting and notifying access to a dangerous area in a workplace using image processing and location tracking technology are disclosed. The system includes a server configured to partition a workplace into grating sections to assign coordinates, set a dangerous object or a dangerous area, and broadcast a notification message including coordinates of the dangerous object and information on the dangerous area, and smart glasses configured to display a grating of an adjacent dangerous area or an adjacent dangerous object in an augmented reality mode by using the coordinates of the dangerous object or the information on the dangerous area that are received.

12 Claims, 8 Drawing Sheets

| Grating zone 410 | CCTV number | Grating number | X-coordinate | Y-coordinate |
|---|---|---|---|---|
| Dangerous area 420 | CCTV number | Grating number | | |
| Dangerous object 430 | CCTV number | Object type | X-coordinate | Y-coordinate |

FIG. 4

SYSTEM AND METHOD FOR DETECTING AND NOTIFYING ACCESS TO DANGEROUS AREAS IN WORKPLACE USING IMAGE PROCESSING AND LOCATION TRACKING TECHNOLOGY

CROSS-REFERENCE TO RELATED APPLICATION(S)

This application claims the benefit of Korean Patent Application No. 10-2020-0157025, filed on Nov. 20, 2020, in the Korean Intellectual Property Office, the disclosure of which is incorporated herein by reference.

BACKGROUND

1. Field of the Invention

Example embodiments relate to a technology for notifying a worker of a danger in a workplace.

2. Description of the Related Art

Accidents happen to workers every year in workplaces such as construction sites, resulting in huge human and material damages.

In the workplaces such as construction sites, it is very important to protect workers from dangers and ensure their safety.

Among safety accidents occurring in a work environment, there are accidents such as contact with a moving dangerous object, and the like. Such accidents result in human damages, corporate property loss, and additional loss due to image degradation, which lead to a problem directly connected to profit realization.

Accordingly, there is a need for a method of promoting the safety of workers by notifying the workers of their access to a dangerous area or a dangerous object approaching the workers in the workplace.

SUMMARY

An aspect provides a system and method for detecting and notifying access to a dangerous area in a workplace using image processing and location tracking technology.

According to an aspect, there is provided a dangerous area notification system including a server configured to partition a workplace into grating sections to assign coordinates, set a dangerous object or a dangerous area, and broadcast a notification message including coordinates of the dangerous object and information on the dangerous area, and smart glasses configured to recognize an augmented reality marker installed in the workplace to display a same grating as a grating generated by the server in an augmented reality mode, continuously identify coordinates of the smart glasses, identify the coordinates of the dangerous object or the information on the dangerous area included in the notification message received from the server, and display a grating of the dangerous area or the dangerous object in the augmented reality mode when the coordinates of the smart glasses are adjacent to the dangerous object or the dangerous area using the coordinates of the dangerous object or the information on the dangerous area.

In this case, the dangerous area notification system may further include a camera configured to provide an image obtained by photographing the workplace to the server. The server may be configured to detect a movement of the dangerous object through image analysis of the image obtained by photographing the workplace, identify the coordinates of the dangerous object and information on the dangerous object changed in response to the movement of the dangerous object, and generate and broadcast the notification message including the coordinates of the dangerous object and the information on the dangerous object that are identified.

In this case, the augmented reality marker may be located at each vertex of a grating partitioned by the server on a floor of the workplace, and may include direction information in which the grating is to be generated.

In this case, the dangerous area notification system may further include at least three signal generators configured to output a signal for identifying the coordinates of the smart glasses. The smart glasses may be configured to continuously identify the coordinates of the smart glasses by performing triangulation using signals outputted from the at least three signal generators.

In this case, when displaying the grating of the dangerous area or the dangerous object in the augmented reality mode, the smart glasses may be configured to set an additional grating zone surrounding the dangerous area as a warning area, and display the warning area in the augmented reality mode in a different color from that of the dangerous area.

In this case, when displaying the grating of the dangerous area or the dangerous object in the augmented reality mode, the smart glasses may be configured to display an area with the dangerous object or the dangerous area in red, and display the warning area in yellow.

In this case, when displaying the grating of the dangerous area or the dangerous object in the augmented reality mode, the smart glasses may be configured to display the information on the dangerous area or the dangerous object present in a blind spot with a letter or a symbol on the smart glasses when the dangerous area or the dangerous object is not in a field of view of the smart glasses.

According to another aspect, there is provided a method for notifying a danger by a dangerous area notification system including partitioning, by a server, a workplace into grating sections to assign coordinates, setting, by the server, a dangerous object or a dangerous area, broadcasting, by the server, a notification message including coordinates of the dangerous object and information on the dangerous area, recognizing, by smart glasses, an augmented reality marker installed in the workplace and displaying, by the server, a same grating as a grating generated by the server in an augmented reality mode, continuously identifying, by the smart glasses, coordinates of the smart glasses, identifying, by the smart glasses, the coordinates of the dangerous object or the information on the dangerous area included in the notification message received from the server, and displaying a grating of the dangerous area or the dangerous object in the augmented reality mode when the coordinates of the smart glasses are adjacent to the dangerous object or the dangerous area using the coordinates of the dangerous object or the information on the dangerous area.

In this case, the broadcasting by the server of the notification message including the coordinates of the dangerous object and the information on the dangerous area may include detecting a movement of the dangerous object through image analysis of an image obtained by photographing the workplace, identifying the coordinates of the dangerous object and information on the dangerous object changed in response to the movement of the dangerous object, and generating and broadcasting the notification message including the coordinates of the dangerous object and the information on the dangerous object that are identified.

In this case, the augmented reality marker may be located at each vertex of a grating partitioned by the server on a floor of the workshop, and may include direction information in which the grating is to be generated.

In this case, the continuously identifying of the coordinates of the smart glasses may include continuously identifying the coordinates of the smart glasses by performing triangulation using signals outputted from at least three signal generators.

In this case, the displaying of the grating of the dangerous area or the dangerous object in the augmented reality mode may include setting an additional grating zone surrounding the dangerous area as a warning area, and displaying the warning area in the augmented reality mode in a different color from that of the dangerous area.

In this case, the displaying of the grating of the dangerous area or the dangerous object in the augmented reality mode may include displaying an area with the dangerous object or the dangerous area in red, and displaying the warning area in yellow.

In this case, the displaying of the grating of the dangerous area or the dangerous object in the augmented reality mode may include displaying the information on the dangerous area or the dangerous object present in a blind spot with a letter or a symbol on the smart glasses when the dangerous area or the dangerous object is not in a field of view of the smart glasses.

Additional aspects of example embodiments will be set forth in part in the description which follows and, in part, will be apparent from the description, or may be learned by practice of the disclosure.

Example embodiments relate to a dangerous area notification system including a server configured to partition a workplace into grating sections to assign coordinates, set a dangerous object or a dangerous area, and broadcast a notification message including coordinates of the dangerous object and information on the dangerous area, and smart glasses configured to recognize an augmented reality marker installed in the workplace to display a same grating as a grating generated by the server in an augmented reality mode, continuously identify coordinates of the smart glasses, identify the coordinates of the dangerous object or the information on the dangerous area included in the notification message received from the server, and display a grating of the dangerous area or the dangerous object in the augmented reality mode when the coordinates of the smart glasses are adjacent to the dangerous object or the dangerous area using the coordinates of the dangerous object or the information on the dangerous area, and relate to an operating method thereof, and may promote the safety of workers with the smart glasses working in the workplace.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 4 is a diagram illustrating a form of information stored in a database of a dangerous area notification system according to an example embodiment;

DETAILED DESCRIPTION

Figure 1:
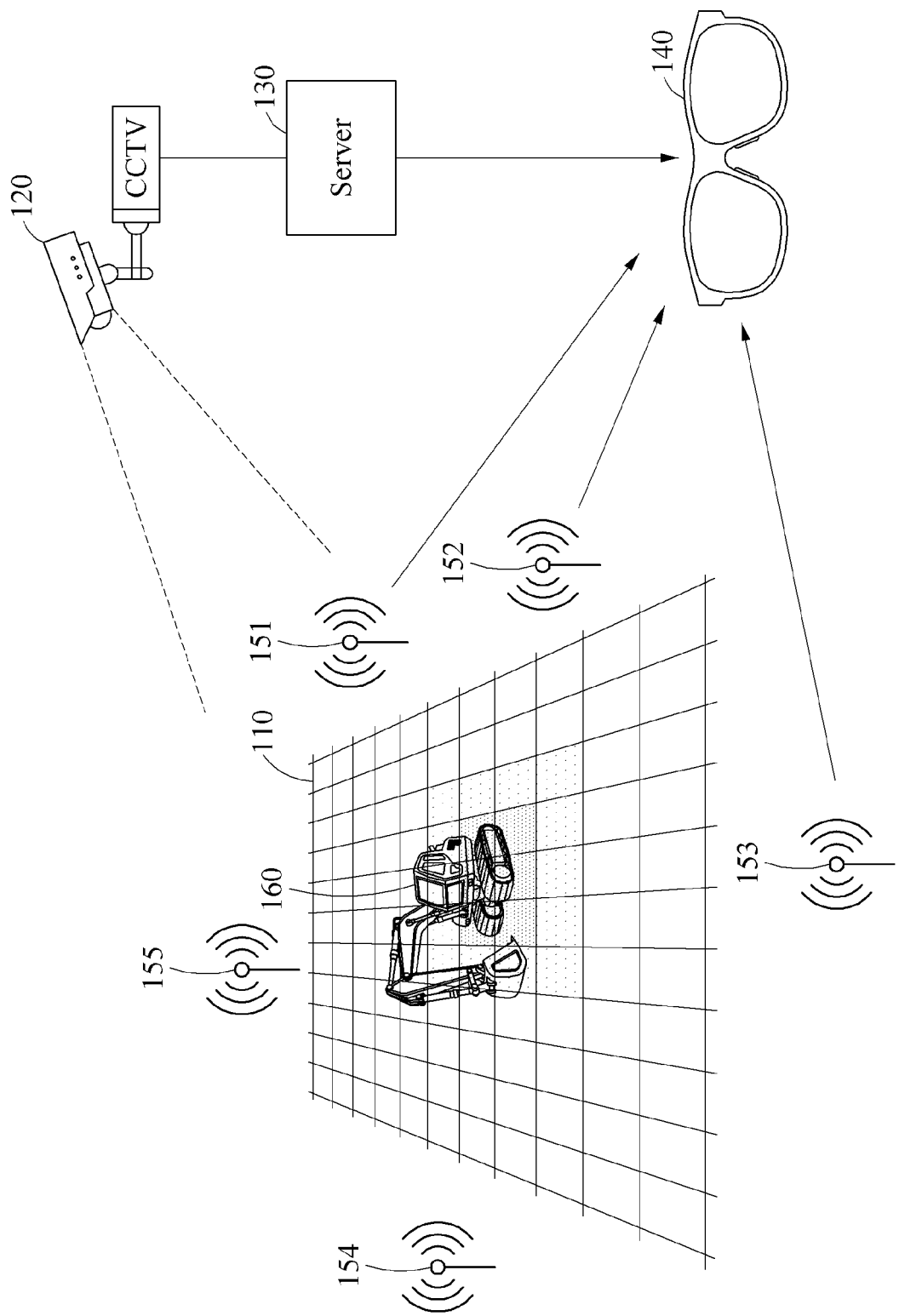
FIG. 1 is a diagram illustrating a schematic configuration of a dangerous area notification system according to an example embodiment.

Hereinafter, example embodiments will be described in detail with reference to the accompanying drawings. The scope of the right, however, should not be construed as limited to the example embodiments set forth herein. Various modifications may be made to the example embodiments. Here, examples are not construed as limited to the example embodiments and should be understood to include all changes, equivalents, and replacements within the idea and the technical scope of the example embodiments.

The terminology used herein is for the purpose of describing particular example embodiments only and is not intended to be limiting. As used herein, the singular forms "a," "an," and "the," are intended to include the plural forms as well, unless the context clearly indicates otherwise. It will be further understood. that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by those skilled in the art to which the example embodiments pertain. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the components in the drawings, it should be noted that the same components will be designated by the same reference numerals, wherever possible, even though they are shown in different drawings. Also, in the description of example embodiments, detailed description of well-known related structures or functions will be omitted when it is deemed that such description will cause ambiguous interpretation of the example embodiments.

In addition, it will be understood that, although the terms first, second, A, B, (a), (b), and the like may be used herein to describe various components of the example embodiments, these terms are only used to distinguish one component from another component and essential, order, or sequence of corresponding components are not limited by these terms. It will be understood that when one component is referred to as being "connected to", "coupled to", or "linked to" another component, one component may be "connected to", "coupled to", or "linked to" another component via a further component although one component may be directly connected to or directly linked to another component.

The same name may be used to describe a component included in an example embodiment and a component having a common function in another example embodiment. Unless otherwise mentioned, the description on the example embodiment may be applicable to the other example embodiment and thus, duplicated description will be omitted for conciseness.

Hereinafter, a system and method for detecting and notifying access to a dangerous area in a workplace using image processing and location tracking technology according to an example embodiment will be described in detail with reference to FIGS. 1 to 8.

FIG. 1 is a diagram illustrating a schematic configuration of a dangerous area notification system according to an example embodiment.

Referring to FIG. 1, the dangerous area notification system may include a camera 120, a server 130, smart glasses 140, and signal generators 151 to 155.

The camera 120 may photograph a workplace, and may provide the photographed image to the server 130.

The signal generators 151 to 155 may output a signal for identifying coordinates of the smart glasses 140 through the smart glasses 140.

The server 130 may partition a workplace 100 into grating sections to assign coordinates, set a dangerous object 160 or a dangerous area, and broadcast a notification message including coordinates of the dangerous object and information on the dangerous area.

More specifically, the server 130 may detect a movement of the dangerous object 160 through image analysis of an image obtained by photographing the workplace 100, identify the coordinates of the dangerous object and information on the dangerous object changed in response to the movement of the dangerous object 160, and generate and broadcast a notification message including the coordinates of the dangerous object and the information on the dangerous object that are identified.

The smart glasses 140, which are glasses capable of providing augmented reality, may recognize an augmented reality marker installed in the workplace 100 to display a same grating as a grating generated by the server 130 in an augmented reality mode, and may continuously identify coordinates of the smart glasses 140.

In this case, the augmented reality marker may be located at each vertex of a grating partitioned by the server 130 on a floor of the workplace. The augmented reality marker may include direction information in which the grating is to be generated. In addition, the smart glasses 140 may continuously identify the coordinates of the smart glasses 140 by performing triangulation using signals outputted from at least three signal generators 151 to 155. Here, the signals outputted from the signal generators 151 to 155 each may be a Bluetooth beacon signal, and a real time location system may be used to obtain the coordinates of the smart glasses 140.

In addition, the smart glasses 140 may identify the coordinates of the dangerous object or the information on the dangerous area included in the notification message received from the server 130, and may display a grating of the dangerous area or the dangerous object in the augmented reality mode when the smart glasses are adjacent to the dangerous object or the dangerous area using the coordinates of the dangerous object or the information on the dangerous area.

When displaying the grating of the dangerous area or the dangerous object in the augmented reality mode, the smart glasses 140 may set an additional grating zone surrounding the dangerous area as a warning area, and may display the warning area in the augmented reality mode in a different color from that of the dangerous area. For example, the smart glasses 140 may display an area with the dangerous object or the dangerous area in red, and may display the warning area in yellow.

In addition, when displaying the grating of the dangerous area or the dangerous object in the augmented reality mode, the smart glasses 140 may display the information on the dangerous area or the dangerous object present in a blind spot with a letter or a symbol on the smart glasses 140 when the dangerous area or the dangerous object is not in a field of view of the smart glasses.

As the smart glasses 140 displays the dangerous area and the warning area in different colors, work may be affected. For example, when it is required to distinguish colors for work, it may be difficult to distinguish colors for work by colors in the augmented reality mode that notifies the dangerous area and the warning area. To this end, the smart glasses 140 may represent color display for the dangerous area and the warning area in a blinking manner, and when entering the dangerous area and the warning area or when the location of the smart glasses 140 is changed to the dangerous area and the warning area, the dangerous area, the warning area, and the dangerous object may be displayed in the augmented reality mode only for a predetermined period of time.

Figure 2:
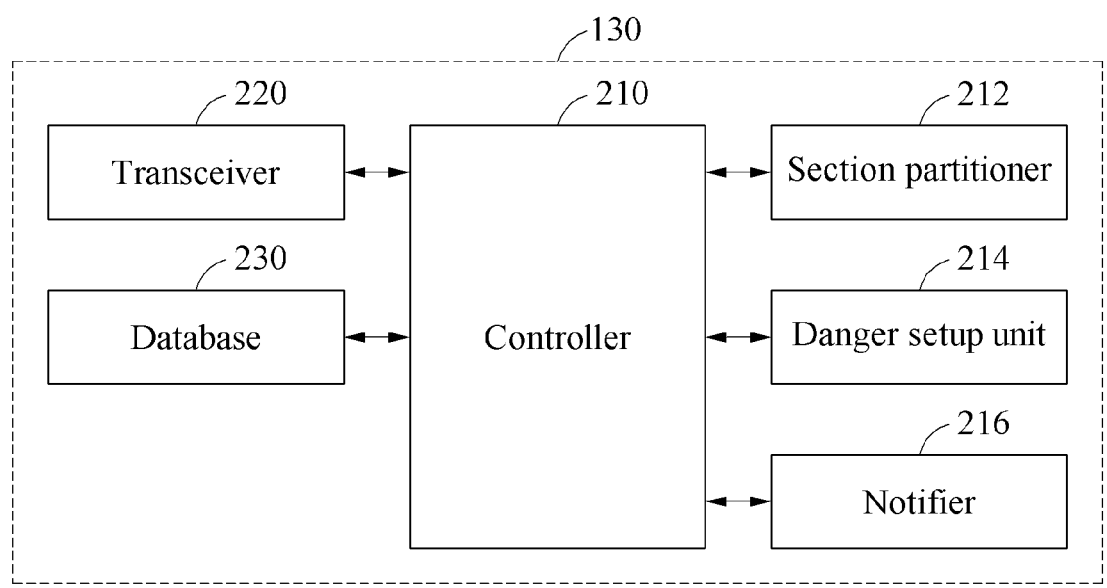
FIG. 2 is a diagram illustrating a configuration of a server of a dangerous area notification system according to an example embodiment.

FIG. 2 is a diagram illustrating a configuration of a server of a dangerous area notification system according to an example embodiment.

Referring to FIG. 2, the server 130 may include a controller 210, a section partitioner 212, a danger setup unit 216, a transceiver 220, and a database 230.

The transceiver 220, which is a communication interface device including a receiver and a transmitter, may transmit and receive data in a wired or wireless manner. Under the control of the controller 210, the transceiver 220 may receive an image of a workplace photographed through the camera 120, and may transmit a notification message to the smart glasses 140.

The database 230 may store information on a grating zone 410 generated by the section partitioner 212, information on a dangerous area 420 generated by the danger setup unit 216, and information on a dangerous object 430 generated by the danger setup unit 216, as illustrated in FIG. 4.

FIG. 4 is a diagram illustrating a form of information stored in a database of a dangerous area notification system according to an example embodiment.

Referring to FIG. 4, the information on a grating zone 410 may include a related CCTV number, each grating number, and information on an x-axis and a y-axis of each grating. In addition, the information on a dangerous area 420 may include a related CCTV number and grating number. In addition, the information on a dangerous object 430 may include a CCTV number, information on a type of an object, and information on an x-axis and a y-axis of the object.

The section partitioner 212 may partition the workplace 100 into grating sections to assign coordinates, and may store information on each grating section in the database 230.

The reason why the workplace is partitioned into the grating sections is that all collision events between workers and dangerous objects may take place on the ground. Accordingly, an area required to determine the dangerous area in an image obtained by photographing the workplace may be a ground portion. In this case, it may be assumed that the entire ground is in a square shape, and the grating section may be partitioned by manually selecting respective four vertices of the workplace ground on a CCTV screen so as to detect only a required portion.

In addition, the section partitioner 212 may select intersection points of boundary lines for partitioning the workplace into the grating sections. In this case, the number of intersection points on all horizontal boundary lines may need to be the same as those of other horizontal boundary lines, and the number of intersection points of vertical boundary lines may also need to be the same as those of other vertical boundary lines. The section partitioner 212 may store coordinates of all selected vertices and intersection points in the database 230 for each grating. When the selection of all the vertices of the ground and the intersection points of the boundary lines is completed, the section partitioner 212 may connect relevant points to generate an entire grating section and divide the workplace.

The danger setup unit 216 may detect a movement of the dangerous object 160 through image analysis of an image obtained by photographing the workplace 100, identify coordinates of the dangerous object and information on the dangerous object changed in response to the movement of the dangerous object 160, and generate and broadcast a notification message including the coordinates of the dangerous object and the information on the dangerous object that are identified. In addition to the dangerous area designated due to the dangerous object 160, the danger setup unit 216 may allow the notification message to include a dangerous area arbitrarily set by an administrator (user) or a dangerous area that meets a preset condition determined through image analysis to broadcast the notification message. Here, examples of the danger area that meet the preset condition may be a pit having a predetermined depth or more, a cement paste, a state of cement before being hardened after cement work, an area where a preset construction machinery that is analyzable through image is present, and the like.

The image analysis of the danger setup unit 216 may detect an object using you only look once (YOLO) suitable for real time.

The YOLO, which is a deep learning-based object detection technique, may theoretically feature a fast processing speed of thirty frames per second. In addition, the danger setup unit 216 may detect a moving object in a manner of comparing a position of the object in a previous frame and a position of the object in a current frame to each other using open source computer vision (OpenCV). Here, when the detected moving object corresponds to the detected dangerous object, the danger setup unit 216 may determine that the dangerous object is moving.

In the danger setup unit 216, all dangerous objects and workers may be detected in a rectangular shape on the screen. The danger setup unit 216 may set one or a plurality of grating portions overlapping a lower portion of a rectangle where the moving dangerous object is detected as a dangerous area. The set grating section may have a square shape.

Figure 5:
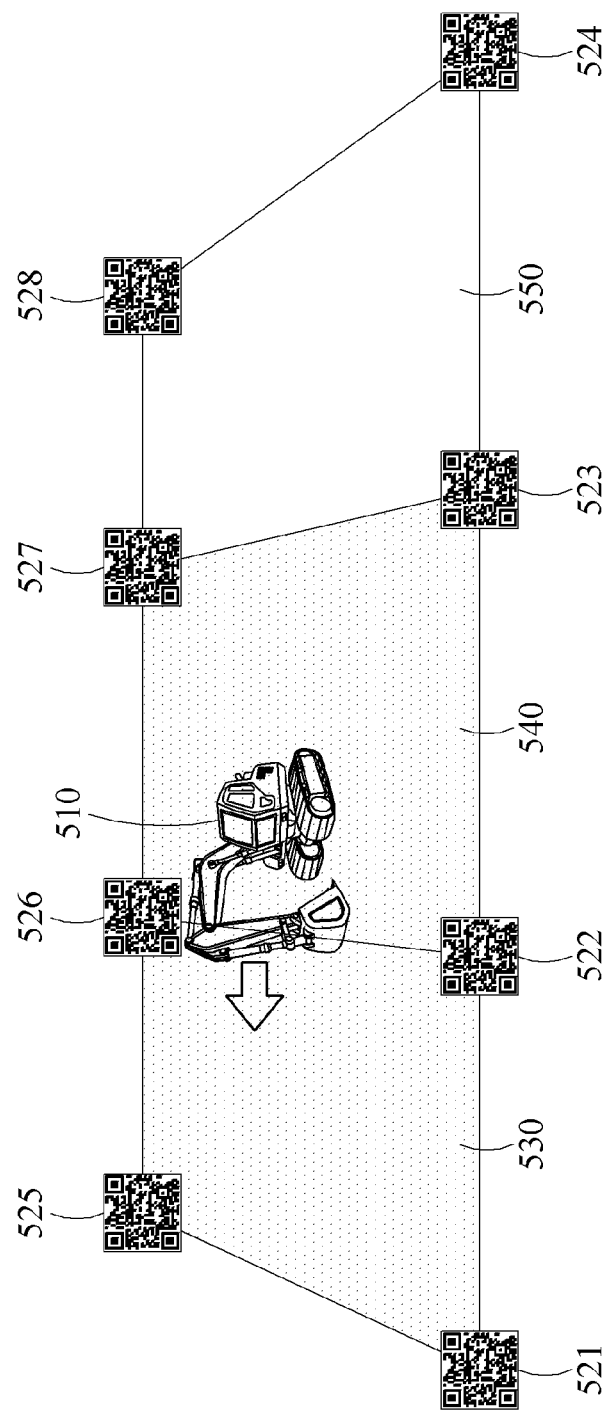
FIG. 5 is a diagram illustrating an example in which a dangerous area is changed as a dangerous object moves in a dangerous area notification system according to an example embodiment.

The danger setup unit 216 may update the dangerous area in response to the movement of the dangerous object as illustrated in FIG. 5 below.

FIG. 5 is a diagram illustrating an example in which a dangerous area is changed as a dangerous object moves in a dangerous area notification system according to an example embodiment.

Referring to FIG. 5, when, among zones partitioned into a first zone 530, a second zone 540, and a third zone 550, a forklift 510 set as a dangerous object is located in the second zone 540, and moves to the first zone 240, the danger setup unit 216 may detect a movement of the forklift 510, and may update a dangerous area set to include only the second zone 540 so as to include the first area 530 and the second area 540. Thereafter, when the forklift 510 completely moves to the first zone 530, the danger setup unit 216 may update the dangerous area set to include the first zone 530 and the second zone 540 so as to include the first zone 530 only.

The dangerous area notification system may allow augmented reality markers 521 to 528 to be located at each vertex of a grating partitioned by the server 130 on a floor of a workplace so that the smart glasses 140 display a grating zone in an augmented reality mode. In this case, the augmented reality markers 521 to 528 may include direction information in which the grating is to be generated.

The controller 210 may control an overall operation of the server 130. In addition, the controller 210 may perform functions of the section partitioner 212 and the danger setup unit 216. The controller 210, the section partitioner 212, and the danger setup unit 216 are illustrated separately to describe respective functions. Accordingly, the controller 210 may include at least one processor configured to perform respective functions of the section partitioner 212 and the danger setup unit 216. In addition, the controller 210 may include at least one processor configured to perform some of the respective functions of the section partitioner 212 and the danger setup unit 216.

Figure 3:
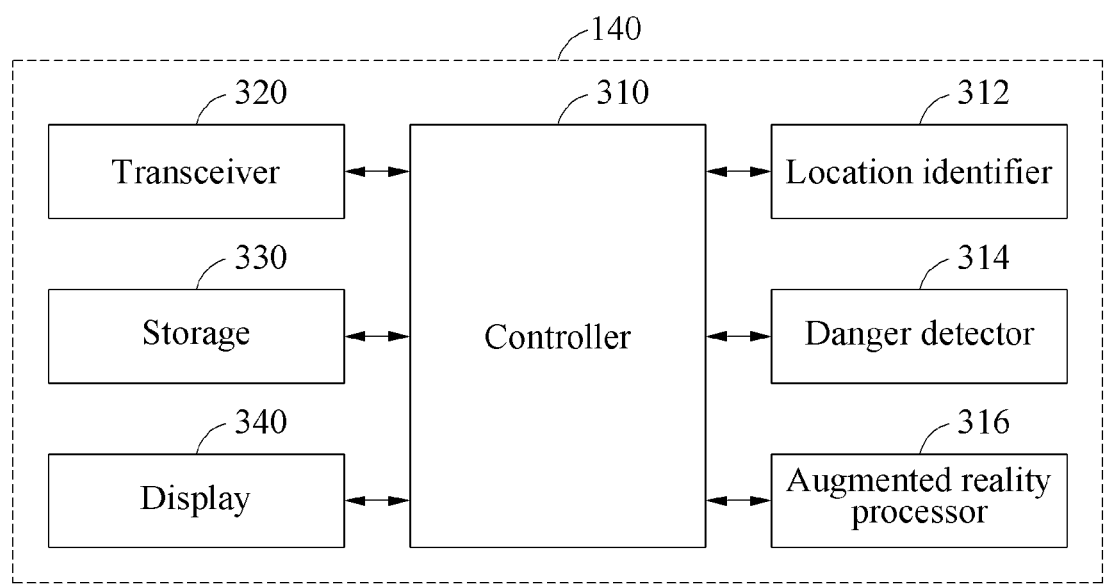
FIG. 3 is a diagram illustrating a configuration of smart glasses of a dangerous area notification system according to an example embodiment.

FIG. 3 is a diagram illustrating a configuration of smart glasses of a dangerous area notification system according to an example embodiment.

Referring to FIG. 3, the smart glasses 140 may include a controller 310, a location identifier 312, a danger detector 314, an augmented reality processor 316, a transceiver 320, a storage 330, and a display 340.

The transceiver 320, which is a communication interface device including a receiver and a transmitter, may transmit and receive data in a wired or wireless manner. Under the control of the controller 310, the transceiver 320 may receive a signal for measuring a location from the signal generators 151 to 155, and may receive a notification message broadcasted by the server 130.

The storage 330 may store an operating system, application program, and data for storage for controlling an overall operation of the smart glasses 140.

The display 340 may display an augmented reality object under the control of the augmented reality processor 316.

The location identifier 312 may continuously identify coordinates of the smart glasses 140 by performing triangulation using signals outputted from the at least three signal generators 151 to 155. Here, a signal for identifying a location may be a Bluetooth beacon signal, or a real time location system may be used.

The danger detector 314 may identify coordinates of a dangerous object or information on a dangerous area included in the notification message received from the server 130, identify whether or not the coordinates of the smart glasses 140 are adjacent to the dangerous object or the dangerous area using the coordinates of the dangerous object or the information on the dangerous area, and provide related information to the augmented reality processor 316 when the coordinates of the smart glasses 140 are adjacent to the dangerous object or the dangerous area.

The augmented reality processor 316 may recognize an augmented reality marker installed in the workplace 100 to display a same grating as a grating generated by the server 130 in an augmented reality mode. In addition, when the danger detector 314 detects that the coordinates of the smart glasses 140 are adjacent to the dangerous object or the dangerous area, the augmented reality processor 316 may display a grating of the dangerous area or the dangerous object in the augmented reality mode. In this case, the augmented reality marker may be located at each vertex of a grating partitioned by the server 130 on a floor of the workplace. The augmented reality marker may include direction information in which the grating is to be generated. The augmented reality markers 521 to 528 may include direction information in which the grating is to be generated, and thus the augmented reality processor 316 may be aware of the presence of the grating even when a specific object covers some of four augmented reality markers involved in the generation of one grating.

When the augmented reality processor 316 displays the grating of the dangerous area or the dangerous object in the augmented reality mode, the augmented reality processor 316 may set an additional grating zone surrounding the dangerous area as a warning area, and may display the warning area in the augmented reality mode is in a different color from that of the dangerous area. For example, the augmented reality processor 316 may display an area with the dangerous object or the dangerous area in red, and may display the warning area in yellow.

Information displayed on the smart glasses 140 by the augmented reality processor 316 may vary depending on a situation. When the dangerous object is in a field of view of a worker, the augmented reality processor 316 may display only a dangerous spot on the floor through the display 340 without displaying information on the dangerous object since the dangerous object is in the field of view of the worker. In addition, when the dangerous area or the dangerous object is not in a field of view of the smart glasses, the augmented reality processor 316 may display the information on the dangerous area or the dangerous object present in a blind spot with a letter or a symbol on the display 340.

The controller 310 may control an overall operation of the smart glasses 140. In addition, the controller 310 may perform functions of the location identifier 312, the danger detector 314, and the augmented reality processor 316. The controller 310, the location identifier 312, the danger detector 314, and the augmented reality processor 316 are illustrated separately to describe respective functions. Accordingly, the controller 310 may include at least one processor configured to perform respective functions of the location identifier 312, the danger detector 314, and the augmented reality processor 316. In addition, the controller 310 may include at least one processor configured to perform some of the respective functions of the location identifier 312, the danger detector 314, and the augmented reality processor 316.

Hereinafter, a method according to example embodiments configured as described above will be described below with reference to the drawings.

Figure 6:
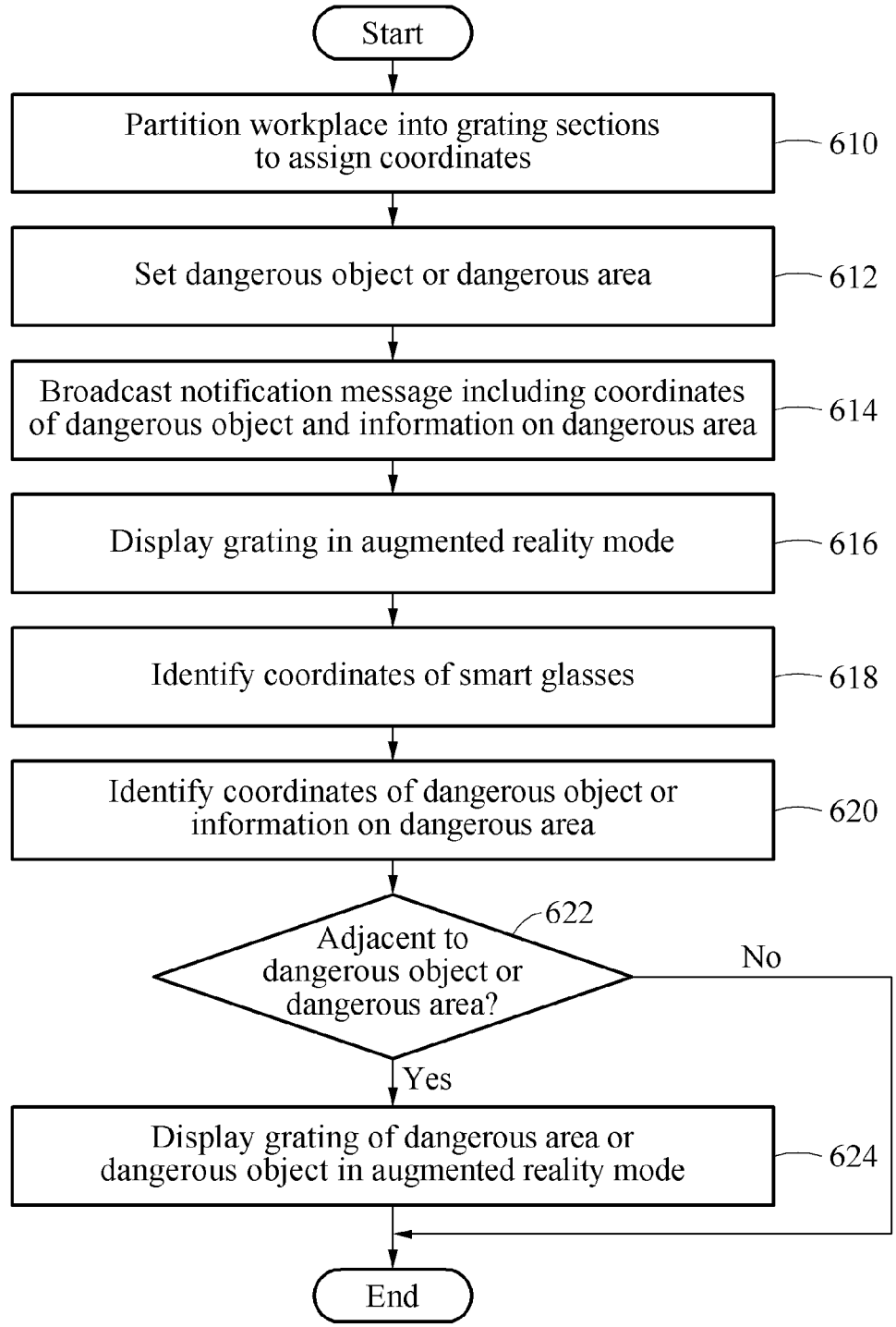
FIG. 6 is a flowchart illustrating a process of notifying a danger by a dangerous area notification system according to an example embodiment.

FIG. 6 is a flowchart illustrating a process of notifying a danger by a dangerous area notification system according to an example embodiment.

Referring to FIG. 6, the server 130 of the dangerous area notification system may partition a workplace into grating sections to assign coordinates in operation 610.

Then, the server 130 of the dangerous area notification system may set a dangerous object or a dangerous area in operation 612.

Then, the server 130 of the dangerous area notification system may broadcast a notification message including coordinates of the dangerous object and information on the dangerous area in operation 614.

Then, the smart glasses 140 of the dangerous area notification system may recognize an augmented reality marker installed in the workplace to display a same grating as a grating generated by the server in an augmented reality mode in operation 616. In this case, the augmented reality marker may be located at each vertex of a grating partitioned by the server 130 on a floor of the workplace. The augmented reality marker may include direction information in which the grating is to be generated.

Then, the smart glasses 140 of the dangerous area notification system may continuously identify coordinates of the smart glasses in operation 618. In operation 618, the smart glasses 140 may continuously identify the coordinates of the smart glasses 140 by performing triangulation using signals outputted from at least three signal generators 151 to 155.

Then, the smart glasses 140 of the dangerous area notification system may identify the coordinates of the dangerous object or the information on the dangerous area included in a notification message received from the server in operation 620.

Then, the smart glasses 140 of the dangerous area notification system may identify whether or not the coordinates of the smart glasses 140 are adjacent to the dangerous object or the dangerous area using the coordinates of the dangerous object or the information on the dangerous area in operation 622.

As a result of the identification in operation 622, when the coordinates of the smart glasses 140 are adjacent to the dangerous object or the dangerous area, the smart glasses 140 of the dangerous area notification system may display a grating of the dangerous area or the dangerous object in the augmented reality mode in operation 624.

In operation 624, the smart glasses 140 may set an additional grating zone surrounding the dangerous area as a warning area, and may display the warning area in the augmented reality mode in a different color from that of the dangerous area. For example, the smart glasses 140 may display an area with the dangerous object or the dangerous area in red, and may display the warning area in yellow.

In operation 624, when the dangerous area or the dangerous object is not in a field of view of the smart glasses, the smart glasses 140 may display the information on the dangerous area or the dangerous object present in a blind spot with a letter or a symbol in the augmented reality mode on the smart glasses 140.

Figure 7:
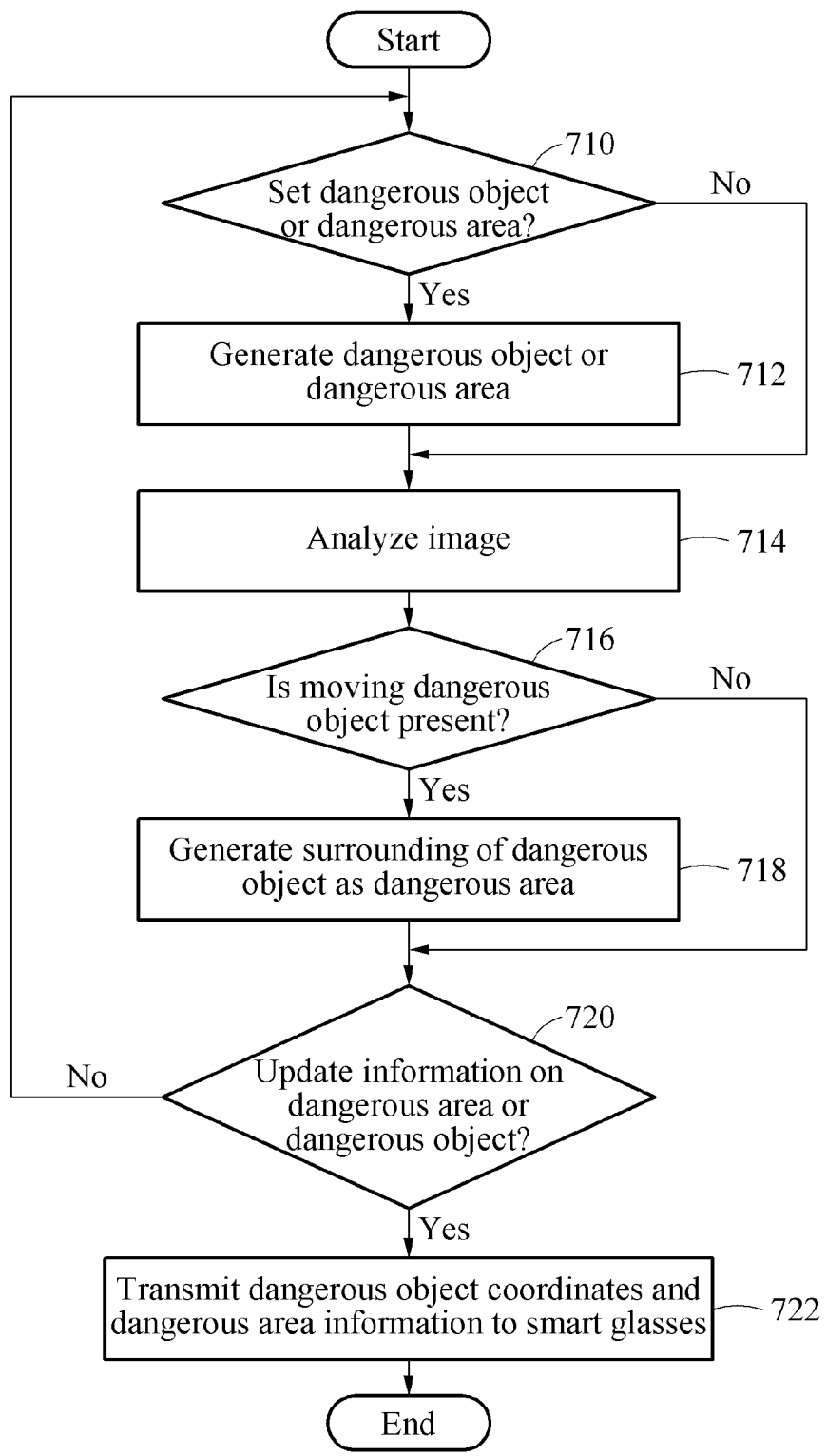
FIG. 7 is a flowchart illustrating a process of transmitting a notification message including coordinates of a dangerous object and information on a dangerous object by a server of a dangerous area notification system according to an example embodiment.

FIG. 7 is a flowchart illustrating a process of transmitting a notification message including coordinates of a dangerous object and information on a dangerous object by a server of a dangerous area notification system according to an example embodiment.

Referring to FIG. 7, when the server 130 detects the occurrence of an event for setting the dangerous object or the dangerous area in operation 710, the server may generate the dangerous object or the dangerous area in operation 712. In this case, a setup event may occur when a preset period or an object with a specific size or more are added to a workplace by the server 130 or at the request of an administrator (user). In addition, the dangerous object or the dangerous area may be designated when a preset condition is met as a result of analyzing an image obtained by photographing the workplace, or may be generated according to an object or area selected by the administrator (user).

Then, the server 130 may analyze the image obtained by photographing the workplace in operation 714.

Then, the server 130 may identify whether or not a moving dangerous object is present as a result of analyzing the image obtained by photographing the workplace in operation 716.

As a result of the identification in operation 716, when the moving dangerous object is present, the server 130 may generate a surrounding of the dangerous object as a new dangerous area in response to a movement of the dangerous object in operation 718.

Then, the server 130 may identify whether or not information on the dangerous area or dangerous object has been updated in operation 720.

As a result of the identification in operation 716, when the information on the dangerous area or the dangerous object has been updated, the server 130 may transmit the updated dangerous object coordinates and dangerous area information to the smart glasses 140 through a broadcast in operation 722.

Figure 8:
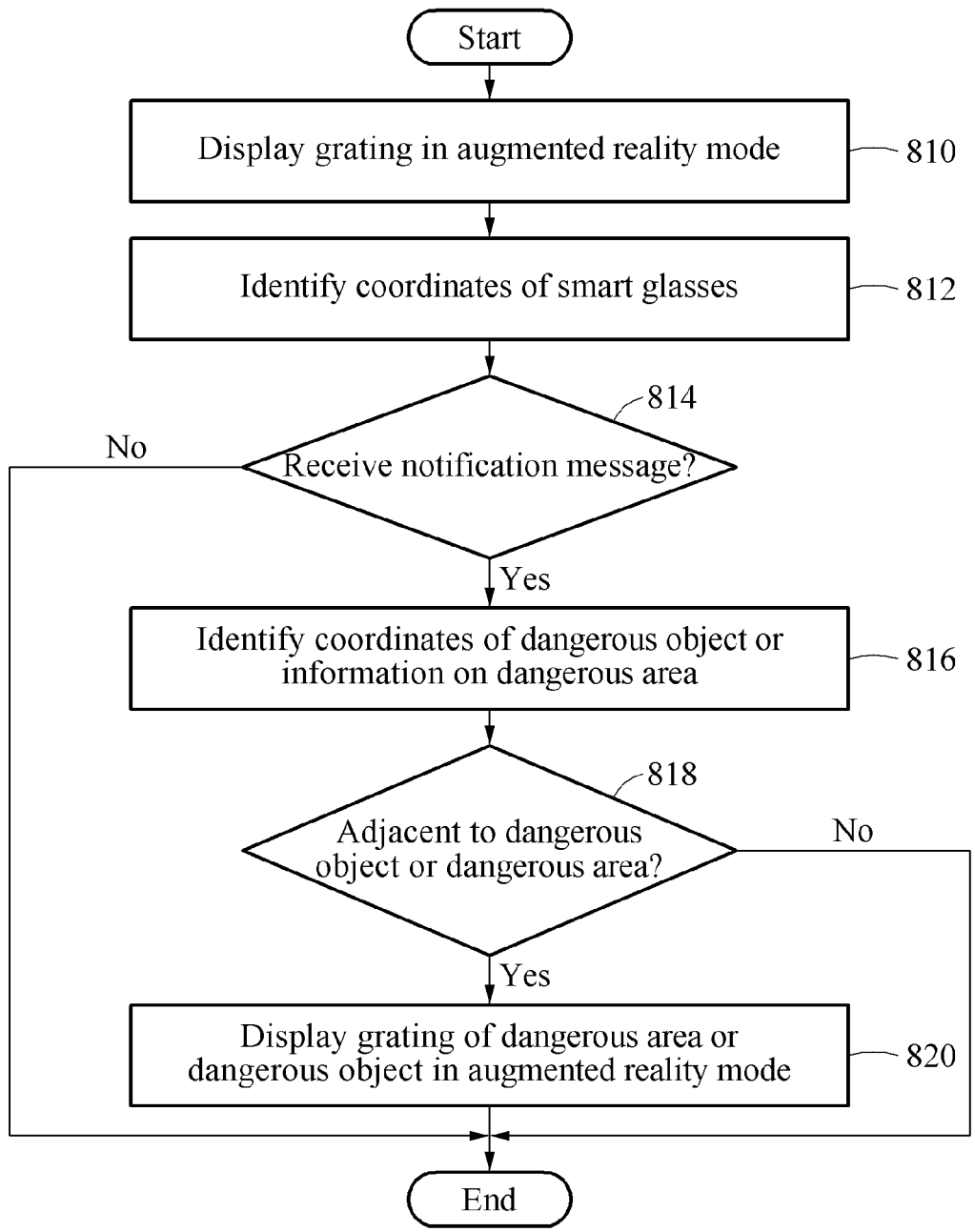
FIG. 8 is a flowchart illustrating a process of displaying a dangerous object or a dangerous area in an augmented reality mode by smart glasses of a dangerous area notification system according to an example embodiment.

FIG. 8 is a flowchart illustrating a process of displaying a dangerous object or a dangerous area in an augmented reality mode by smart glasses of a dangerous area notification system according to an example embodiment.

Referring to FIG. 8, the smart glass 140 may recognize an augmented reality marker installed in a workplace to display a same grating as a grating generated by a server in an augmented reality mode in operation 810. In this case, the augmented reality marker may be located at each vertex of a grating partitioned by the server 130 on a floor of the workplace. The augmented reality marker may include direction information in which the grating is to be generated.

Then, the smart glasses 140 may continuously identify coordinates of the smart glasses in operation 812. In operation 812, the smart glasses 140 may continuously identify the coordinates of the smart glasses 140 by performing triangulation using signals outputted from at least three signal generators 151 to 155.

Then, when the smart glasses 140 receive a notification message from the server 130 in operation 814, the smart glasses 140 may identify coordinates of the dangerous object or information on the dangerous area included in the received notification message in operation 816.

Then, the smart glasses 140 may identify whether or not the coordinates of the smart glasses 140 are adjacent to the dangerous object or the dangerous area using the coordinates of the dangerous object or the information on the dangerous area in operation 818.

As a result of the identification in operation 818, when the coordinates of the smart glasses 140 are adjacent to the dangerous object or the dangerous area, the smart glasses 140 of the dangerous area notification system may display a grating of the dangerous area or the dangerous object in the augmented reality mode in operation 820.

In operation 820, the smart glasses 140 may set an additional grating zone surrounding the dangerous area as a warning area, and may display the warning area in the augmented reality mode in a different color from that of the dangerous area. For example, the smart glasses 140 may display an area with the dangerous object or the dangerous area in red, and may display the warning area in yellow.

In operation 820, when the dangerous area or the dangerous object is not in a field of view of the smart glasses 140, the smart glasses 140 may display the information on the dangerous area or the dangerous object present in a blind spot with a letter or a symbol in the augmented reality mode on the smart glasses 140.

The method according to example embodiments may be implemented in the form of a program instruction that may be executed through various computer mechanisms, thereby being recorded in a computer-readable medium. The computer-readable medium may include program instructions, data files, data structures, and the like, independently or in combination thereof. The program instructions recorded in the medium may be specially designed and configured for the example embodiments, or may be known to those skilled in the art of computer software so as to be used. An example of the computer-readable medium includes a hard disk, a magnetic media such as a floppy disk and a magnetic tape, an optical media such as a CD-ROM and a DVD, a magneto-optical media such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The above hardware device may be configured to operate as at least one software module to perform the operations of the example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be split over network coupled computer systems so that the software is stored and executed in a split fashion. The software and data may be stored by one or more computer readable recording mediums.

Although the example embodiments have been described with reference to the limited drawings as described above, various modifications and changes may be made from the foregoing descriptions by those skilled in the art. For example, suitable results can be achieved even if the described techniques are performed in a different order, and/or even if components of the described system, structure, device, circuit, and the like are coupled or combined in a different manner, or are replaced or substituted by other components or their equivalents.

Therefore, other implementations, other example embodiments, and equivalents to the claims are also within the scope of the following claims.

What is claimed is:

1. A dangerous area notification system comprising:
 a server configured to partition a workplace into grating sections to assign coordinates, set a dangerous object or a dangerous area, and broadcast a notification message including coordinates of the dangerous object and information on the dangerous area; and smart glasses configured to recognize an augmented reality marker installed in the workplace to display a same grating as a grating generated by the server in an augmented reality mode, continuously identify coordinates of the smart glasses, identify the coordinates of the dangerous object or the information on the dangerous area included in the notification message received from the server, and display a grating of the dangerous area or the dangerous object in the augmented reality mode when the coordinates of the smart glasses are adjacent to the dangerous object or the dangerous area using the coordinates of the dangerous object or the information on the dangerous area, wherein the augmented reality marker is located at each vertex of a grating partitioned by the server on a floor of the workplace, and includes direction information in which the grating is to be generated.

2. The dangerous area notification system of claim 1, further comprising:

a camera configured to provide an image obtained by photographing the workplace to the server, wherein the server is configured to detect a movement of the dangerous object through image analysis of the image obtained by photographing the workplace, identify the coordinates of the dangerous object and information on the dangerous object changed in response to the movement of the dangerous object, and generate and broadcast the notification message including the coordinates of the dangerous object and the information on the dangerous object that are identified.

3. The dangerous area notification system of claim 1, further comprising:

at least three signal generators configured to output a signal for identifying the coordinates of the smart glasses, wherein the smart glasses are configured to continuously identify the coordinates of the smart glasses by performing triangulation using signals outputted from the at least three signal generators.

4. The dangerous area notification system of claim 1, wherein, when displaying the grating of the dangerous area or the dangerous object in the augmented reality mode, the smart glasses is configured to set an additional grating zone surrounding the dangerous area as a warning area, and display the warning area in the augmented reality mode in a different color from that of the dangerous area.

5. The dangerous area notification system of claim 4, wherein, when displaying the grating of the dangerous area or the dangerous object in the augmented reality mode, the smart glasses are configured to display an area with the dangerous object or the dangerous area in red, and display the warning area in yellow.

6. The dangerous area notification system of claim 1, wherein, when displaying the grating of the dangerous area or the dangerous object in the augmented reality mode, the smart glasses are configured to display the information on the dangerous area or the dangerous object present in a blind spot with a letter or a symbol on the smart glasses when the dangerous area or the dangerous object is not in a field of view of the smart glasses.

7. A method for notifying a danger by a dangerous area notification system comprising:

partitioning, by a server, a workplace into grating sections to assign coordinates;

setting, by the server, a dangerous object or a dangerous area;

broadcasting, by the server, a notification message including coordinates of the dangerous object and information on the dangerous area;

recognizing, by smart glasses, an augmented reality marker installed in the workplace and displaying, by the server, a same grating as a grating generated by the server in an augmented reality mode;

continuously identifying, by the smart glasses, coordinates of the smart glasses;

identifying, by the smart glasses, the coordinates of the dangerous object or the information on the dangerous area included in the notification message received from the server; and displaying a grating of the dangerous area or the dangerous object in the augmented reality mode when the coordinates of the smart glasses are adjacent to the dangerous object or the dangerous area using the coordinates of the dangerous object or the information on the dangerous area, wherein the augmented reality marker is located at each vertex of a grating partitioned by the server on a floor of the workplace, and includes direction information in which the grating is to be generated.

8. The method of claim 7, wherein the broadcasting, by the server, of the notification message including the coordinates of the dangerous object and the information on the dangerous area comprises:

detecting a movement of the dangerous object through image analysis of an image obtained by photographing the workplace;

identifying the coordinates of the dangerous object and information on the dangerous object changed in response to the movement of the dangerous object; and generating and broadcasting the notification message including the coordinates of the dangerous object and the information on the dangerous object that are identified.

9. The method of claim 7, wherein the continuously identifying of the coordinates of the smart glasses comprises:

continuously identifying the coordinates of the smart glasses by performing triangulation using signals outputted from at least three signal generators.

10. The method of claim 7, wherein the displaying of the grating of the dangerous area or the dangerous object in the augmented reality mode comprises:

setting an additional grating zone surrounding the dangerous area as a warning area, and displaying the warning area in the augmented reality mode in a different color from that of the dangerous area.

11. The method of claim 10, wherein the displaying of the grating of the dangerous area or the dangerous object in the augmented reality mode comprises:

displaying an area with the dangerous object or the dangerous area in red, and displaying the warning area in yellow.

12. The method of claim 7, wherein the displaying of the grating of the dangerous area or the dangerous object in the augmented reality mode comprises:

displaying the information on the dangerous area or the dangerous object present in a blind spot with a letter or a symbol on the smart glasses when the dangerous area or the dangerous object is not in a field of view of the smart glasses.

* * * * *